(12) United States Patent
Miyasaka

(10) Patent No.: US 7,406,891 B2
(45) Date of Patent: Aug. 5, 2008

(54) INJECTION MOLDED RESIN GEAR AND INJECTION MOLDED RESIN ROTATING BODY

(75) Inventor: Shoji Miyasaka, Okegawa (JP)

(73) Assignee: Enplas Corporation (JP)

( * ) Notice: Subject to any disclaimer, the term of this patent is extended or adjusted under 35 U.S.C. 154(b) by 837 days.

(21) Appl. No.: 10/858,902

(22) Filed: Jun. 1, 2004

(65) Prior Publication Data

US 2004/0241276 A1    Dec. 2, 2004

(30) Foreign Application Priority Data

Jun. 2, 2003 (JP) ............................ 2003-156087

(51) Int. Cl.
*F16H 55/17* (2006.01)

(52) U.S. Cl. ..................... 74/431; 74/DIG. 10; 425/542

(58) Field of Classification Search ................... 74/431, 74/434, 451, 460, DIG. 10; 425/542, 543, 425/556

See application file for complete search history.

(56) References Cited

U.S. PATENT DOCUMENTS 4,781,879 A    11/1988  Oishi

FOREIGN PATENT DOCUMENTS

| JP | 62148219   | 7/1987  |
| JP | 2-44701    | 10/1990 |
| JP | 08025501   | 1/1996  |
| JP | 8-132542   | 5/1996  |
| JP | 08132542   | 5/1996  |
| JP | 11156892   | 11/1997 |
| JP | 10034762   | 2/1998  |
| JP | 2003035355 | 2/2003  |

*Primary Examiner*—William C Joyce
(74) *Attorney, Agent, or Firm*—Bachman & LaPointe, P.C.

(57) ABSTRACT

An injection molded resin gear 1, which is molded by injecting a resin material from a plurality of pinpoint gates 13 into a cavity 2 of a die, includes a rim 7 having teeth 8 on its outer periphery, a shaft supporting portion 5 into which a shaft 3 is to be fitted, a web 6 extending in radial directions to connect the rim 7 to the shaft supporting portion 5, and a plurality of resin flow velocity regulating grooves 11. When the resin material injected from the pin point gates 13 flows in the cavity 2 outwardly in radial directions, the uniformity of the flow velocity of the resin material passing over portions of the cavity 2 corresponding to the resin flow velocity regulating grooves 11 is improved, and the uniformity of the flow velocity of the resin material passing over a portion of the cavity 2 corresponding to an outside circumferential groove 12 is more sufficiently improved, so that the uniformity of the flow velocity of the resin material in a portion of the cavity 2 corresponding to the web 6 is improved before the resin material reaches a portion of the cavity 2 corresponding to the rim 7.

12 Claims, 12 Drawing Sheets

INJECTION MOLDED RESIN GEAR AND INJECTION MOLDED RESIN ROTATING BODY

BACKGROUND OF THE INVENTION

1. Field of the Invention

The present invention generally relates to an injection molded resin gear and an injection molded resin rotating body. More specifically, the invention relates to an injection molded resin gear for use in power transmission devices for various automotive parts, industrial equipments and precision instruments, and an injection molded resin rotating body, such as an injection molded resin gear, sprocket, pulley or roller.

2. Description of the Prior Art

In recent years, automotive parts operating by driving force from a driving source, such as a motor, has many resin gears, which are formed by injection molding, in order to reduce the weight and operation noises thereof.

FIG. 17 is a longitudinal section of such an injection molded resin gear 50, and FIG. 18 is a left side view of the injection molded resin gear 50 of FIG. 17, which is viewed from the left side of FIG. 17. The injection molded resin gear 50 shown in FIGS. 17 and 18 is mold by injecting a molten resin material into a cavity, which has the same shape as that of the gear 50, from one or a plurality of (three in FIG. 18) pin point gates 51.

However, if the resin material is injected into the cavity from the three pin point gates 51 as shown in FIG. 18, parts of the resin material injected from the respective pin point gates 51 meet each other in a substantially middle portion between adjacent two of the pinpoint gates 51 as shown by arrows, to produce weld lines 53 on a web 52. If the weld lines 53 are produced on the injection molded article (the injection molded resin gear 50), there are some cases where the weld lines 53 do not only have a bad influence on the precision of tooth profile, but they also have a bad influence the strength of the gear. In particular, if the resin material to be injected is a reinforced plastic containing glass or carbon fibers, it is known that the strength of the gear is deteriorated by 40 to 60%.

Therefore, as shown in FIG. 19, there has been developed an injection molding technique for using a ring-shaped gate 54 to inject a resin material from the ring-shaped gate 54 to allow the resin material to flow in a cavity in radial directions from an inner peripheral end toward an outer periphery to prevent the occurrence of weld lines 53 shown in FIG. 18. This injection molding technique is often used for molding a gear of a fiber reinforced plastic.

However, if the ring-shaped gate 54 is used for injection molding, the amount of the resin material remaining in the ring-shaped gate 54 after injection molding is larger than that if the pin point gates 51 are used for injection molding, and the amount of wasteful resin material (resin material which is not used as a product and which is cut off from the product) is larger than that if the pin point gates 51 are used for injection molding, so that the yield of the resin material is deteriorated. As a result, the price of the product (the injection molded resin gear 50) formed by injection molding using the ring-shaped gate 54 is higher than the price of the product (the injection molded resin gear 50) formed by injection molding using the pinpoint gates 51. In particular, if an expensive resin material containing reinforced fibers is used as the resin material for injection molding, the difference in price between the products formed by injection molding using the ring-shaped gate 54 and pin point gates 51 is remarkably great.

In addition, in the case of the product (the injection molded resin gear 50) formed by using injection molding the ring-shaped gate 54, after the ring-shaped gate 54 is cut off, it is require to machine and scrape the cut scar of the ring-shaped gate 54 off, so that there is a problem in that the working cost is higher than that in the case of the product (the injection molded resin gear 50) formed by injection molding using the pin point gates 51. Furthermore, in the case of the injection molded resin gear 50 formed by injection molding using the pin point gates 51, the opening area of the pin point gates 51 is small, and the pin point gates 51 are easily removed from the product (the injection molded resin gear 50) when the die is released after injection molding. Therefore, there are advantages in that the cut scars of the pin point gates 51 are inconspicuous, so that it is not required to carry out subsequent working.

In order to eliminate such problems, as shown in FIG. 20, there has been developed a technique wherein a gear 61 molded by injecting a resin material containing reinforced fibers from a plurality of pin point gates 60 is formed with a plurality of web portions 62 and radial ribs 63, and the plurality of pin point gates 60 are arranged in every other positions between adjacent two of the radial ribs 63 for dividing and controlling the flow of a molten resin material, which is injected into a cavity from the pin point gates 60, to equalize the orientation of the resin material to improve the precision of shape and dimension (see Japanese Patent Laid-Open No. 2-44701).

Also, as shown in FIGS. 21 and 22, there has been developed a technique wherein a polymeric material flow regulating mechanism 72 for reducing the differences in filling time and pressure during an injection molding process is formed inside of a tooth portion 71 in the vicinity of teeth on both sides of a gear 70 (see Japanese Patent Laid-Open No. 8-132542). According to this technique, a resin material injected from pin point gates 73 reaches the polymeric material flow regulating mechanism 72 to raise its internal pressure to flow into an unfilled portion, in which pressure is low, to be filled in the polymeric material flow regulating mechanism 72 over the whole circumference thereof, and the resin material flows toward the periphery of teeth when the internal pressure is uniform. Furthermore, the polymeric material flow regulating mechanism 72 is a groove formed in the vicinity of the tooth portion 71 inside thereof, and the groove depth thereof continuously or intermittently varies.

However, the techniques disclosed in Japanese Patent Laid-Open Nos. 2-44701 and 8-132542 can not sufficiently reduce the weld lines 53 which are shown in FIG. 18 and which are produced in the joining portions of parts of the resin material, which are injected from adjacent two of the pin point gates 51, on the web 52 for connecting a rim 55, on which teeth 55 are formed, to a shaft supporting portion 57 into which a shaft is fitted, so that it is not possible to satisfy the strength of the web 52 and the precision of tooth profile to such an extent that they are required on the market in recent years.

SUMMARY OF THE INVENTION

It is therefore an object of the present invention to eliminate the aforementioned problems and to provide an injection molded resin gear or an injection molded resin rotation body capable of effectively inhibiting the occurrence of weld lines when it is formed by using one or a plurality of pin point gates.

It is another object of the present invention to provide an injection molded resin gear or an injection molded resin rotation body capable of arranging the orientation of a reinforced fiber containing resin over the whole circumference in a portion of a cavity of a die for forming a web and of making the flow velocity of the resin material in radial directions uniform before the flow of the resin material reaches a portion of the cavity for forming a rim, so that it is possible to enhance the strength of the web and the molding precision.

In order to accomplish the aforementioned and other objects, according to one aspect of the present invention, there is provided an injection molded resin gear molded by injecting a resin material from a pin point gate into a cavity of a die, the injection molded resin gear comprising: a rim having teeth on the outer periphery thereof; a shaft supporting portion for receiving and supporting a shaft therein; a web extending in radial directions to connect the rim to the shaft supporting portion; and a resin flow velocity regulating groove formed in one side of the web so as to be arranged in the vicinity of the pin point gate when the resin material is injected from the pin point gate into the cavity of the die, the resin flow velocity regulating groove having a shape which corresponds to that of a resin flow velocity regulating protrusion of the die for restricting the radial flow of the resin material, which is injected from the pin point gate, to cause the resin material to flow at a uniform velocity in radial directions between the pin point gate and a portion of the cavity corresponding to the rim, wherein the resin flow velocity regulating groove includes a first groove portion which is arranged so as to face the pin point gate in radial directions when the resin material is injected from the pin point gate, and a pair of second groove portions, each of which extends from an end of the first groove portion in a circumferential direction so as to have a gradually decreasing groove depth.

In this injection molded resin gear, the resin material may be a reinforced fiber containing resin material. The injected molded resin gear may further comprise a first annular groove which is formed in the one side of the web outside of the resin flow velocity regulating groove in radial directions so as to be concentric with the rim. In addition, the injected molded resin gear may further comprise a second annular groove which is formed in the one side of the web inside of the resin flow velocity regulating groove in radial directions so as to be concentric with the rim, the pin point gate being arranged between the resin flow velocity regulating groove and the second annular groove when the resin material is injected from the pin point gate.

According to another aspect of the present invention, there is provided an injection molded resin gear molded by injecting a resin material from a plurality of pin point gates into a cavity of a die, the injection molded resin gear comprising: a rim having teeth on the outer periphery thereof; a shaft supporting portion for receiving and supporting a shaft therein; a web extending in radial directions to connect the rim to the shaft supporting portion; and a plurality of resin flow velocity regulating grooves, each of which is formed in one side of the web so as to be arranged in the vicinity of a corresponding one of the plurality of pin point gates when the resin material is injected from the plurality of pin point gates into the cavity of the die, each of the resin flow velocity regulating grooves having a shape which corresponds to that of a resin flow velocity regulating protrusion of the die for restricting the radial flow of the resin material, which is injected from the corresponding one of the plurality of pin point gates, to cause the resin material to flow at a uniform velocity in radial directions between the corresponding one of the plurality of pin point gates and a portion of the cavity corresponding to the rim, wherein each of the resin flow velocity regulating grooves includes a first groove portion which is arranged so as to face the corresponding one of the plurality of pin point gates in radial directions when the resin material is injected from the plurality of pin point gates, and a pair of second groove portions, each of which extends from an end of the first groove portion in a circumferential direction so as to have a gradually decreasing groove depth.

In this injection molded resin gear, the resin material may be a reinforced fiber containing resin material. The injected molded resin gear may further comprise a first annular groove which is formed in the one side of the web outside of the plurality of resin flow velocity regulating grooves in radial directions so as to be concentric with the rim. In addition, the injected molded resin gear may further comprise a second annular groove which is formed in the one side of the web inside of the plurality of resin flow velocity regulating grooves in radial directions so as to be concentric with the rim, the plurality of pin point gates being arranged between the plurality of resin flow velocity regulating grooves and the second annular groove when the resin material is injected from the plurality of pin point gates.

According to a further aspect of the present invention, there is provided an injection molded resin rotating body molded by injecting a resin material from a pin point gate into a cavity of a die, the injection molded resin rotating body comprising: an outside cylindrical portion; a shaft supporting portion for receiving and supporting a shaft therein; a disk-shaped portion extending in radial directions to connect the outside cylindrical portion to the shaft supporting portion; and a resin flow velocity regulating groove formed in one side of the disk-shaped portion so as to be arranged in the vicinity of the pin point gate when the resin material is injected from the pin point gate into the cavity of the die, the resin flow velocity regulating groove having a shape which corresponds to that of a resin flow velocity regulating protrusion of the die for restricting the radial flow of the resin material, which is injected from the pin point gate, to cause the resin material to flow at a uniform velocity in radial directions between the pin point gate and a portion of the cavity corresponding to the outside cylindrical portion, wherein the resin flow velocity regulating groove includes a first groove portion which is arranged so as to face the pin point gate in radial directions when the resin material is injected from the pin point gate, and a pair of second groove portions, each of which extends from an end of the first groove portion in a circumferential direction so as to have a gradually decreasing groove depth.

In this injection molded resin rotating body, the resin material maybe a reinforced fiber containing resin material. The injected molded resin rotating body may further comprise a first annular groove which is formed in the one side of the disk-shaped portion outside of the resin flow velocity regulating groove in radial directions so as to be concentric with the outside cylindrical portion. In addition, the injected molded resin rotating body may further comprise a second annular groove which is formed in the one side of the disk-shaped portion inside of the resin flow velocity regulating groove in radial directions so as to be concentric with the outside cylindrical portion, the pin point gate being arranged between the resin flow velocity regulating groove and the second annular groove when the resin material is injected from the pin point gate.

According to a still further aspect of the present invention, there is provided an injection molded resin rotating body molded by injecting a resin material from a plurality of pin point gates into a cavity of a die, the injection molded resin gear comprising: an outside cylindrical portion; a shaft supporting portion for receiving and supporting a shaft therein; a disk-shaped portion extending in radial directions to connect the outside cylindrical portion to the shaft supporting portion;

and a plurality of resin flow velocity regulating grooves, each of which is formed in one side of the disk-shaped portion so as to be arranged in the vicinity of a corresponding one of the plurality of pin point gates when the resin material is injected from the plurality of pin point gates into the cavity of the die, each of the resin flow velocity regulating grooves having a shape which corresponds to that of a resin flow velocity regulating protrusion of the die for restricting the radial low of the resin material, which is injected from the corresponding one of the plurality of pin point gates, to cause the resin material to flow at a uniform velocity in radial directions between the corresponding one of the plurality of pin point gates and a portion of the cavity corresponding to the outside cylindrical portion, wherein each of the resin flow velocity regulating grooves includes a first groove portion which is arranged so as to face a corresponding one of the plurality of pin point gates in radial directions when the resin material is injected from the plurality of pin point gates, and a pair of second groove portions, each of which extends from an end of the first groove portion in a circumferential direction so as to have a gradually decreasing groove depth.

In this injection molded resin rotating body, the resin material may be a reinforced fiber containing resin material. The injected molded resin rotating body may further comprise a first annular groove which is formed in the one side of the web outside of the plurality of resin flow velocity regulating grooves in radial directions so as to be concentric with the outside cylindrical portion. In addition, the injected molded resin rotating body may further comprise a second annular groove which is formed in the one side of the disk-shaped portion inside of the plurality of resin flow velocity regulating grooves in radial directions so as to be concentric with the outside cylindrical portion, the plurality of pin point gates being arranged between the plurality of resin flow velocity regulating grooves and the second annular groove when the resin material is injected from the plurality of pin point gates.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

[First Preferred Embodiment]

Figure 1:
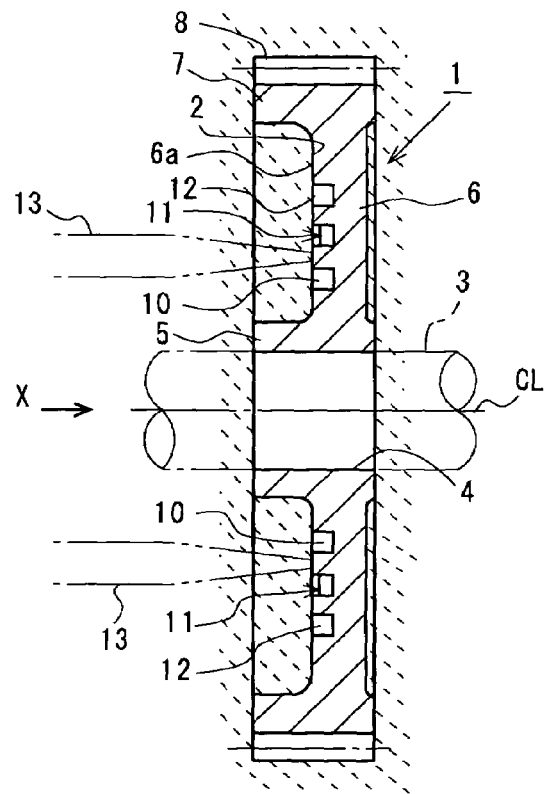
FIG. 1 is a longitudinal section of the first preferred embodiment of an injection molded resin gear according to the present invention (a sectional view taken along line I-I of FIG. 2)
Figure 2:
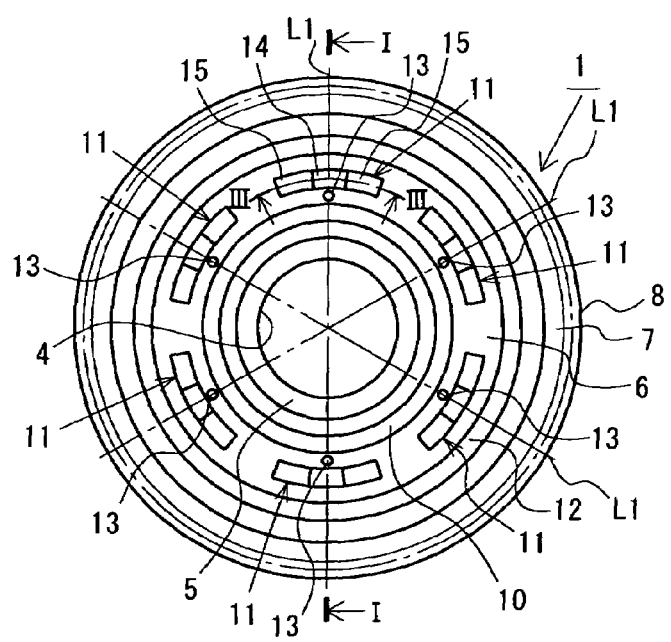
FIG. 2 is a left side view (viewed in the direction of arrow X in FIG. 1) of the injection molded resin gear of FIG. 1.
Figure 3:
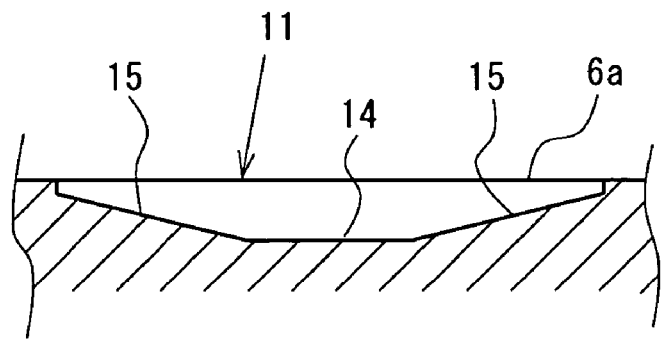
FIG. 3 is an enlarged sectional view taken along line III-III of FIG. 2, which shows a first example of a resin flow velocity regulating groove.

FIGS. 1 through 3 show the first preferred embodiment of an injection molded resin gear 1 according to the present invention. FIG. 1 is a longitudinal section of the injection molded resin gear 1 (a sectional view taken along line I-I of FIG. 2), and FIG. 2 is a left side view of the injection molded resin gear 1 (viewed in the direction of arrow X in FIG. 1). FIG. 3 is an enlarged sectional view of a resin flow velocity regulating groove taken along line III-III of FIG. 2. In FIG. 1, a cavity 2 for molding the injection molded resin gear 1 is schematically shown by slanting dotted lines.

The injection molded resin gear 1 shown in these figures is molded by injecting a resin material, such as polyacetal, polyamide, polyphenylene sulfide or polybutylene terephthalate, which contains reinforced fibers (glass or carbon fibers).

The injection molded resin gear 1 comprises: a substantially cylindrical shaft supporting portion 5 having an axial hole 4 at its central portion, into which a shaft 3 is to be fitted; a substantially disk-shaped web 6 which extends outwardly in radial directions from the side of one end of the shaft supporting portion 5 in axial directions; and a substantially annular rim 7 formed on the outer periphery of the web 6. The outer periphery of the rim 7 of the injection molded resin gear 1 is formed with teeth 8 having a tooth profile suitable for intended purpose.

In a side 6a (a left side in FIG. 1) of the web 6 for connecting the shaft supporting portion 5 to the rim 7 in radial directions, a substantially annular inside circumferential groove (annular groove) 10, six resin flow velocity regulating grooves 11 and a substantially annular outside circumferential groove (another annular groove) 12 are sequentially formed so as to be concentric with the shaft supporting portion 5.

The resin flow velocity regulating grooves 11 are formed at regular intervals so as to be arranged outside of six pin point gates 13, which are arranged at regular intervals in circumferential directions of the web 6, in radial directions and so as to face the pinpoint gates 13. Each of the resin flow velocity regulating grooves 11 comprises a first groove portion 14 which is most deeply formed so as to be arranged in the vicinity of a corresponding one of the pin point gates 13, and a pair of second groove portions 15, each of which extends from a corresponding one of both ends of the first groove portion 14 in circumferential directions so as to have a gradually decreasing groove depth. That is, each of the resin flow velocity regulating grooves 11 has the second groove portions 15 formed on both sides of the first groove portion 14. The first groove portion 14 of each of the resin flow velocity regulating grooves 11 is arranged on a straight line L1 which extends outwardly in radial directions from a corresponding one of the pin point gates 13. Adjacent two of the second groove portions 15 of adjacent two of the resin flow velocity regulating grooves 11 are separated from each other. The distance between adjacent two of the resin flow velocity regulating grooves 11 (the length of a portion in which any one of the resin flow velocity regulating grooves 11 is not formed) can be suitably changed in view of the orientation of reinforced fibers and the flow velocity of the resin material.

Figure 6:
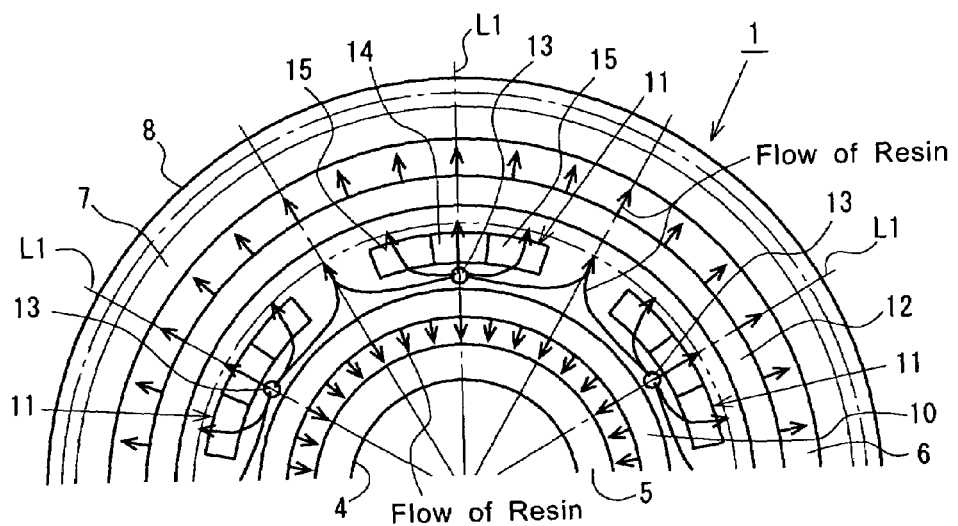
FIG. 6 is an enlarged view of a part of the left side view of the injection molded gear of FIG. 1, for explaining the state of flow of a resin material.

The portion of each of the resin flow velocity regulating grooves 11, which is arranged so as to be nearest to a corresponding one of the pin point gates 13 is the first groove portion 14. By a portion of the cavity 2 for forming the first groove portion 14, the flow of the resin material is most conspicuously restricted, so that the flow velocity of the resin material is deteriorated. Since the groove depth of each of the second groove portions 15 of each of the resin flow velocity regulating grooves 11 gradually decreases as a distance from a corresponding one of the pin point gates 13 increases in circumferential directions, the extent of restriction of the flow of the resin material decreases as a distance from the corresponding one of the pin point gates 13 increases in circumferential directions, so that the rate of reduction in flow velocity of the resin material gradually decreases as a distance from the corresponding one of the pin point gates 13 increases in circumferential directions. Thus, as shown in FIG. 6, the uniformity of the flow velocity of parts of the resin material, which are injected from the pin point gates 13, in radial directions are substantially obtained outside of the resin flow velocity regulating grooves 11 until the parts of the resin material reach the outside circumferential groove 12. Then, the flow velocity of the parts of the resin material in a portion, in which the parts of the resin material injected from adjacent two of the pin point gates 13 meet each other (in the middle portion between adjacent two of the pin point gates 13), is substantially equal to the flow velocity of the parts of the resin material passing through the resin flow velocity regulating grooves 11, so that the orientation of the reinforced fibers in the resin is substantially uniform.

Figure 4:
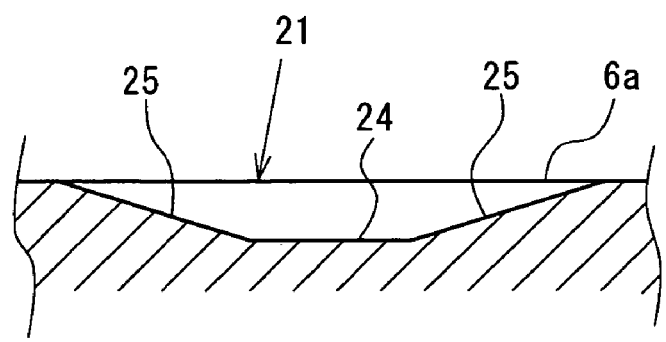
FIG. 4 is an enlarged sectional view corresponding to FIG. 3, which shows a second example of a resin flow velocity regulating groove.
Figure 5:
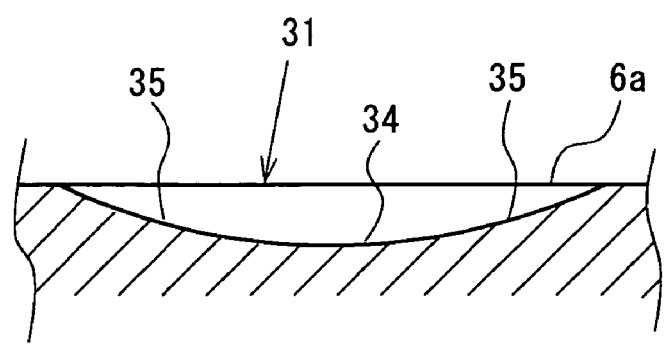
FIG. 5 is an enlarged sectional view corresponding to FIG. 3, which shows a third example of a resin flow velocity regulating groove.

As shown in FIG. 3, each of the resin flow velocity regulating grooves 11 comprises the first groove portion 14 having the same groove depth, and the pair of second groove portions 15 having a groove depth which gradually decreases as a distance from the end portion of the first groove portion 14 increases. The end portion of each of the second groove portions 15 is raised in directions perpendicular to the side 6a. The bottom face of the first groove portion 14 is a flat surface which is parallel to the side 6a, and the bottom face of each of the second groove portions 15 is an inclined surface. However, the resin flow velocity regulating grooves 11 should not be limited to the embodiment shown in FIG. 3, but they may be formed as shown in FIG. 4 or 5. That is, the resin flow velocity regulating groove 21 shown in FIG. 4 has such a shape that each of the second groove portions 15 of the resin flow velocity regulating groove 11 shown in FIG. 3 linearly extends to the side 6a, and has a cross-section of an upside-down isosceles trapezoid. The resin flow velocity regulating groove 31 shown in FIG. 5 has a substantially circular-arc-shaped cross section so that its groove depth is deepest at the substantially center of the groove 31 in longitudinal directions (left and right directions in FIG. 5). The deepest portion 34 of the resin flow velocity regulating groove 31 shown in FIG. 5 corresponds to the first groove portion 24 shown in FIG. 4, and portions 35, which are raised so as to describe an arc while gradually decreasing their groove depth from the deepest portion 34, correspond to the second groove portions 25 shown in FIG. 4.

Then, when the resin material injected from the pin point gates 13 passes over a portion of the cavity 2 for forming the outside circumferential groove 12, the flow of the resin material is uniformly restricted over the whole area in circumferential directions. Thus, after the resin material passes over the portion of the cavity 2 for forming the outside circumferential groove 12, the flow velocity of the resin material flowing outwardly in radial directions is more sufficiently uniform.

In addition, when the resin material injected from the pin point gates 13 passes over a portion of the cavity 2 for forming the inside circumferential groove 10, the flow of the resin material is uniformly restricted over the whole area in circumferential directions, so that the uniformity of the flow velocity of the resin material flowing inwardly in radial directions from the pin point gates 13 is improved.

In this preferred embodiment, the outside circumferential groove 12 and the inside circumferential groove 10 substantially have the same groove width as that of each of the resin flow velocity regulating grooves 11, and substantially have the same groove depth as that of the first groove portion 14 of each of the resin flow velocity regulating grooves 11. The portion of the cavity 2 for forming the outside circumferential groove 12 has the function of restricting the flow of the resin material, which flows outwardly in radial directions from the pin point gates 13, in a portion of the cavity 2 outside of the resin flow velocity regulating grooves 11 and sufficiently inside of the rim 7 in radial directions, to arrange the flow of the resin material flowing outwardly in radial directions to improve the uniformity of the flow velocity of the resin material flowing outwardly in radial directions. The portion of the cavity 2 for forming the inside circumferential groove 10 has the function of restricting the flow of the resin material, which flows inwardly in radial directions from the pin point gates 13, to arrange the flow of the resin material flowing inwardly in radial directions to improve the uniformity of the flow velocity of the resin material flowing inwardly in radial directions.

Furthermore, the groove width and groove depth of the outside circumferential groove 12 and inside circumferential groove 11 may be different from those of each of the resin flow velocity regulating grooves 11 in accordance with the actual flow of the resin material since the state of the flow of the resin material injected into the cavity 2 varies in accordance with the shape of the gear or the like. The groove width and groove depth of the outside circumferential groove 12 and inside circumferential groove 10 may suitably vary in accordance with their circumferential positions. That is, if the flow velocities of parts of the resin material, which are injected from the pin point gates 13, in radial directions are different, the filling rate of the resin material in the cavity 2 is not uniform, so that a difference in cooling rate of the molten resin material is caused to deteriorate the roundness of the gear so as not to precisely form tooth profile. Therefore, the groove width and groove depth of the outside circumferential groove 12 and inside circumferential groove 10 are preferably changed so as to improve the uniformity of the flow velocity of the resin material in radial directions.

Figure 7:
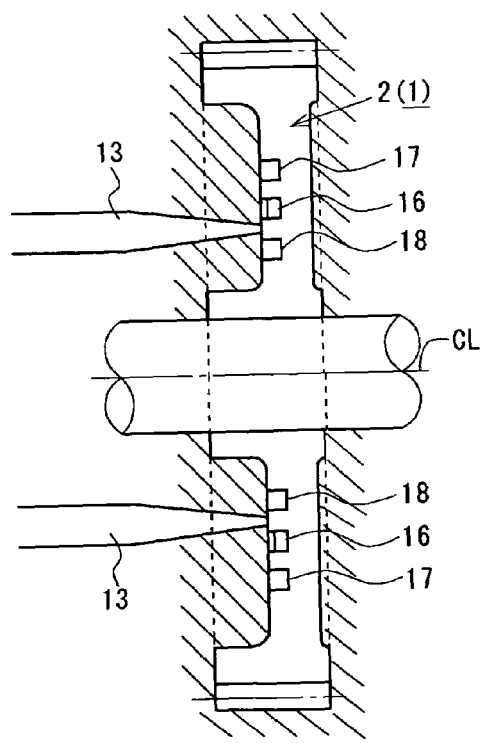
FIG. 7 is a schematically sectional view of a cavity for molding the first preferred embodiment of an injection molded resin gear according to the present invention.

According to this preferred embodiment with such a construction, as shown in FIGS. 6 and 7, after the resin material, which is injected from the pin point gates 13 open to the interior of the cavity 2 for forming the injection molded resin gear 1, substantially flows in radial directions in the cavity 2, the resin material flows in radial directions. Then, parts of the resin material flowing in directions substantially perpendicular to radial directions from adjacent two of the pin point gates 13 meet each other in the middle portion in circumferential directions, so that the parts of the resin material flow outwardly or inwardly in radial directions in the joining portion. Since the flow velocity of the resin material injected from the pin point gates 13 into the cavity 2 is higher as the component of velocity in directions of the straight line L1, which extends in radial directions between the center CL of rotation of the injection molded resin gear 1 and a corresponding one of the pinpoint gates 13, is greater, the component of velocity in the directions of the straight line L1 decreases as a distance from the corresponding one of the pin point gates 13 increases in circumferential directions.

However, according to this preferred embodiment, the flow of the resin material having a large component of velocity in the directions of the straight line L1 is greatly restricted by the first groove portion forming protruding portion of each of resin flow velocity regulating groove forming protrusions 16 which protrude in the cavity 2 to form the resin flow velocity regulating groove 11, so that the flow velocity of the resin material in the directions of the straight line L1 decreases. In addition, with respect to the flow of the resin material having a component of velocity in the directions of the straight line L1, the component of velocity decreasing as a distance from a corresponding one of the pin point gates 13 increases, the extent of restriction of the flow of the resin material restricted by the second groove portion forming protruding portion of each of the resin flow velocity regulating groove forming protrusions 16 gradually decreases since the height of the second groove portion forming protruding portion of each of the resin flow velocity regulating groove forming protrusions 16 gradually decreases as a distance from the corresponding one of the pin point gates 13 increases. Moreover, since each of the resin flow velocity regulating groove forming protrusions 16 is not formed in the joining portion in which parts of the resin material injected from adjacent two of the pin point gates 13 meet each other, the flow of the resin material is smoothly guided by adjacent two of the resin flow velocity regulating groove forming protrusions 16.

As a result, the flow velocity of the resin material, which is injected into the cavity 2 from the pin point gates 13, outwardly in radial directions is controlled by each of the resin flow velocity regulating groove forming protrusions 16, so that the flow of the resin material outwardly in radial directions is arranged to improve the uniformity of the flow velocity of the resin material outwardly in radial directions. In the joining portion in which parts of the resin material meet each other between adjacent two of the pin point gates 13, the flow of the resin material is smoothly guided in radial directions by adjacent two of the resin flow velocity regulating groove forming protrusions 16, so that the flow of the resin material is arranged. Therefore, the weld lines disappear early (soon after the parts of the resin material meet each other), so that the orientation of the reinforced fibers approaches that of other portions in circumferential directions. Thus, the tensile strength of the web 6 is improved in comparison with a case where the resin flow velocity regulating groove forming protrusions 16 (the resin flow velocity regulating grooves 11) are not arranged inside of the web 6 in radial directions (e.g., Japanese Patent Laid-Open No. 8-132542).

Since the flow of the resin material flowing in the cavity 2 to reach outside of each of the resin flow velocity regulating groove forming protrusions 16 in radial directions is uniformly restricted at circumferential positions by an annular outside circumferential groove forming protrusion 17, even if there is a slight variation in flow velocity of the resin material at circumferential positions (even if the resin flow velocity regulating groove forming protrusions 16 is insufficient for the uniformity of the flow velocity of the resin material), the resin material passes over the outside circumferential groove forming protrusion 17 to decrease the difference in flow velocity at circumferential positions, so that the uniformity of the flow velocity of the resin material is sufficiently improved in the web 6 before reaching a portion of the cavity 2 for forming the rim 7.

Since the flow of the resin material injected into the cavity 2 from the pin point gates 13 to flow inwardly in radial directions is restricted by an annular inside circumferential groove forming protrusion 18 arranged outside of the shaft supporting portion 5 in radial directions, the difference in flow velocity at circumferential positions is decreased, so that the flow velocity of the resin material is more sufficiently uniform over the whole area in circumferential directions than a case where a resin gear having no inside circumferential groove 10 inside of the pin point gates in radial directions is formed by injection molding.

After the injection molded resin gear 1 thus molded is cooled in the cavity 2 of the die, it is taken out of the cavity 2. When the resin gear 1 is released from the die, the pin point gates 13 are separated from the side 6a. However, after the pin point gates 13 are separated, the cut scars remaining on the side 6a of the injection molded resin gear 1 are fine so that it is not required to carry out machining. Therefore, since it is not required to machine the cut scars formed by separating the gates, it is possible to improve production efficiency in comparison with a case where injection molding is carried out by using a ring-shaped gate. Thus, it is possible to reduce production costs, so that it is possible to provide an inexpensive injection molded resin gear. In addition, since the injection molded resin gear 1 in this preferred embodiment is formed by injection molding using the pin point gates 13, the yield of an expensive resin material containing reinforced fibers can be improved in comparison with a case where injection molding is carried out by using the ring-shaped gate. Also at this point, it is possible to reduce the price of the product.

As described above, in the case of the injection molded resin gear 1 in this preferred embodiment, the uniformity of the flow velocity of the resin material is improved by the portions corresponding to the resin flow velocity regulating grooves 11 (the resin flow velocity regulating groove forming protrusions 16) when the resin material injected from the pin point gates 13 flows in the cavity 2 outwardly in radial directions, and the uniformity of the flow velocity of the resin material is improved when the resin material passing over the portions corresponding to the resin flow velocity regulating grooves 11 passes over the portion corresponding to the outside circumferential groove 12 (the outside circumferential groove forming protrusion 17), so that the uniformity of the flow velocity of the resin material is improved in the portion corresponding to the web 6 before reaching the portion corresponding to the rim 7 on which the teeth 8 are formed. As a result, in the case of the injection molded resin gear 1 in this preferred embodiment, the uniformity of the cooling rate of the rim 7 and teeth 8 is improved, and the uniformity of the amount of shrinkage of the rim 7 and teeth 8 during cooling is improved in circumferential directions. Thus, the precision of the gear, such as roundness, is improved, so that it is possible to precisely transmit power.

In the case of the injection molded resin gear 1 in this preferred embodiment, the uniformity of the flow velocity of the resin material, which is injected into the cavity 2 from the pin point gates 13, inwardly in radial directions is improved by the portion corresponding to the inside circumferential groove 10 (the inside circumferential groove forming protrusion 18). Therefore, the uniformity of the flow velocity of the resin material filled in the portion corresponding to the shaft supporting portion 5 in the cavity 2 is improved, and the uniformity of the cooling rate of the shaft supporting portion 5 is improved, so that the precision of shape of the shaft supporting portion 5 can be improved. That is, in the case of the injection molded resin gear 1 in this preferred embodiment, the precision of shape of the shaft supporting portion 5, into which the shaft 3 is to be fitted, is high, and the precision of shape of the teeth 8 is high, so that the precision of tooth profile can be more sufficiently improved than that a case where the precision of teeth is only improved.

In the case of the injection molded resin gear 1 in this preferred embodiment, in the joining portion of parts of the resin material between adjacent two of the pin point gates 13, the flow of the resin material is smoothly guided in radial directions by adjacent two of the resin flow velocity regulating grooves 11, so that the flow of the resin material is arranged. Therefore, the weld lines disappear early (soon after parts of the resin material meet each other), so that the orientation of the reinforced fibers approaches that of other portions in circumferential directions. Thus, the tensile strength of the web 6 is improved.

While the inside circumferential groove 10, the resin flow velocity regulating grooves 11 and the outside circumferential groove 12 have been formed in one portion in radial directions of the web 6, respectively, in this preferred embodiment, the present invention should not be limited thereto, but they may be suitably formed in a plurality of portions in radial directions of the web 6, respectively, if necessary.

[Second Preferred Embodiment]

Figure 8:
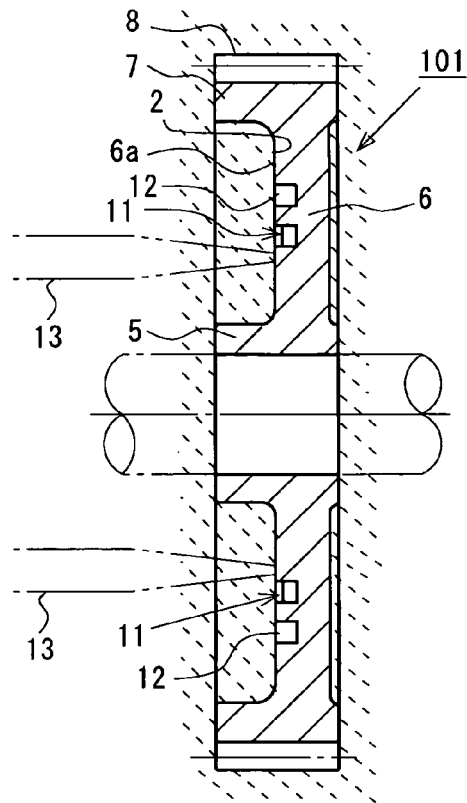
FIG. 8 is a longitudinal section of the second preferred embodiment of an injection molded resin gear according to the present invention (a sectional view taken along line VIII-VIII of FIG. 9)
Figure 9:
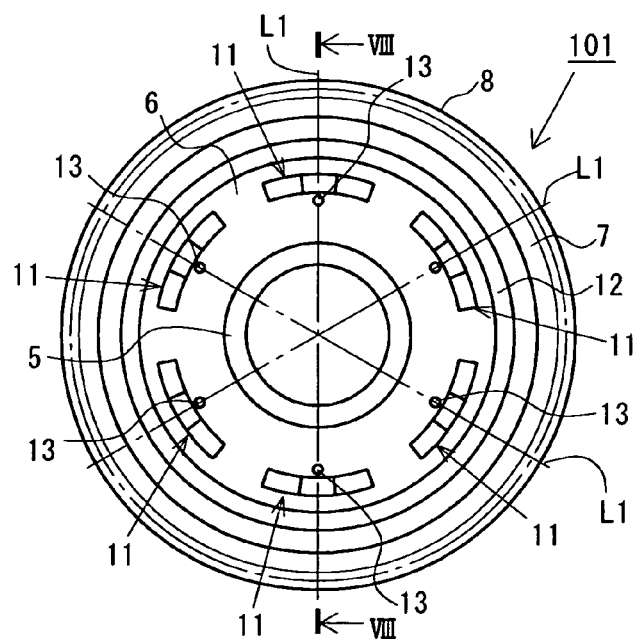
FIG. 9 is a left side view of the injection molded resin gear of FIG. 8.

As shown in FIGS. 8 and 9, an injection molded resin gear 101 in this preferred embodiment substantially has the same construction as that of the injection molded resin gear 1 in the first preferred embodiment, except that the inside circumferential groove 10 is omitted. The inside circumferential groove 10 may be thus omitted if the required precision of the shaft supporting portion 5 can be ensured even if the inside circumferential groove 10 is not formed.

[Third Preferred Embodiment]

Figure 10:
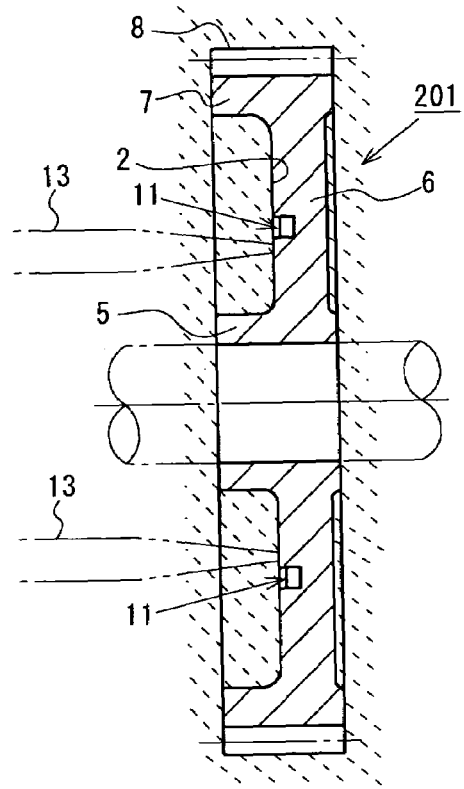
FIG. 10 is a longitudinal section of the third preferred embodiment of an injection molded resin gear according to the present invention (a sectional view taken along line X-X of FIG. 11)
Figure 11:
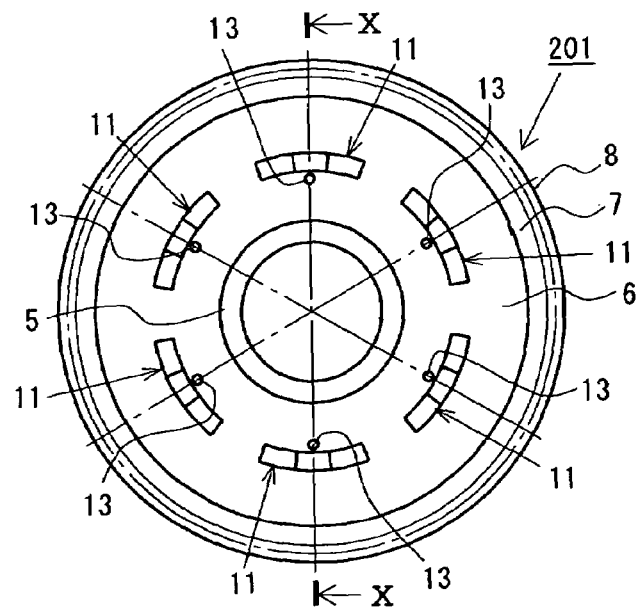
FIG. 11 is a left side view of the injection molded resin gear of FIG. 10.

As shown in FIGS. 10 and 11, an injection molded resin gear 201 in this preferred embodiment substantially has the same construction as that of the injection molded resin gear 1 in the first preferred embodiment, except that the inside circumferential groove 10 and the outside circumferential groove 12 are omitted. The inside circumferential groove 10 and the outside circumferential groove 12 may be thus omitted if the uniformity of the flow velocity of a resin material flowing outwardly in radial directions can be sufficiently improved by the resin flow velocity regulating grooves 11 and if the required precision of the shaft supporting portion 5 can be ensured even if the inside circumferential groove 10 is not formed.

[Fourth Preferred Embodiment]

Figure 12:
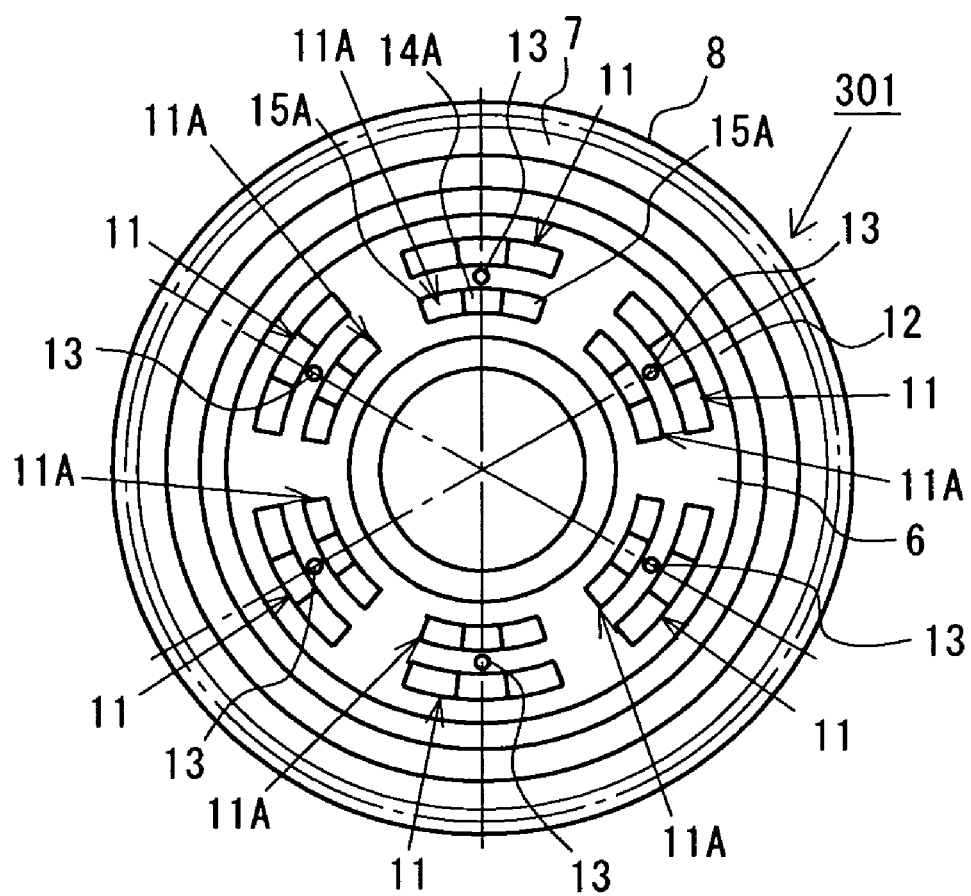
FIG. 12 is a left side view of the fourth preferred embodiment of an injection molded resin gear according to the present invention.

As shown in FIG. 12, an injection molded resin gear 301 in this preferred embodiment substantially has the same construction as that of the injection molded resin gear 1 in the first preferred embodiment, except that inside resin flow velocity regulating grooves 11A similar to the resin flow velocity regulating grooves 11 are formed in place of the inside circumferential groove 10. That is, each of the inside resin flow velocity regulating grooves 11A has the same construction as that of each of the resin flow velocity regulating grooves 11 formed outside of the pin point gates 13 in radial directions. Each of the inside resin flow velocity regulating grooves 11A comprises a first groove portion 14A which is arranged in the vicinity of a corresponding one of the pin point gates 13 and which has a greatest groove depth, and a pair of second groove portions 15A which are arranged on both sides of the first groove portion 14 in circumferential directions and which have a groove depth gradually decreasing as a distance from the corresponding one of the pin point gates 13 increases.

[Fifth Preferred Embodiment]

Figure 13:
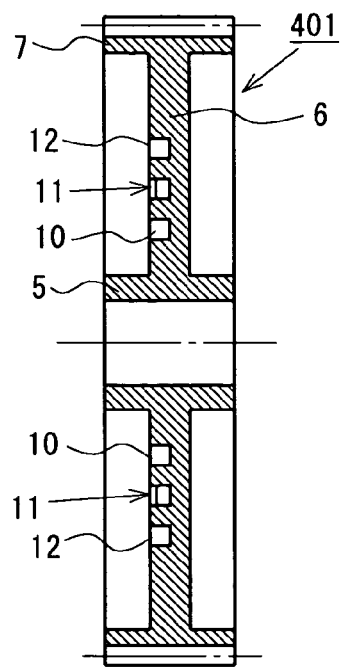
FIG. 13 is a longitudinal section of a first example of the fifth preferred embodiment of an injection molded resin gear according to the present invention.
Figure 14:
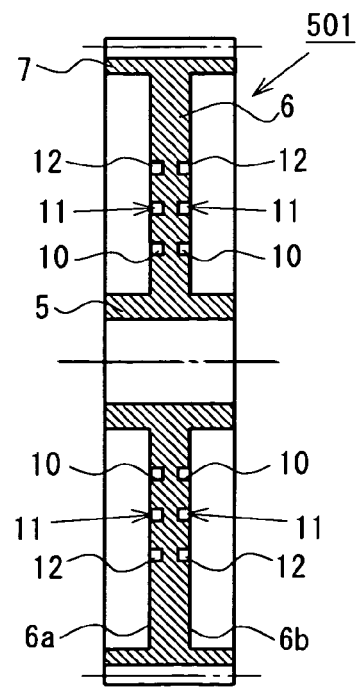
FIG. 14 is a longitudinal section of a second example of the fifth preferred embodiment of an injection molded resin gear according to the present invention.

As shown in FIG. 13, an injection molded resin gear 401 in this preferred embodiment substantially has the same construction as that of the injection molded resin gear 1 in the first preferred embodiment wherein the web 6 is formed on the side of one end of the rim 7 in width directions as shown in FIG. 1, except that the web 6 is formed substantially in the central portion of the rim 7 in width directions. Alternatively, as an injection molded resin gear 501 shown in FIG. 14, the inside circumferential grooves 10, the resin flow velocity regulating grooves 11 and the outside circumferential groove 12 may be formed in both sides of the web 6 so as to be symmetrical with respect to the web 6. Furthermore, in FIG. 14, the inside circumferential groove 10, the resin flow velocity regulating grooves 11 and the outside circumferential groove 12 on the side of one side 6b of the web 6 may be displaced in a radial direction from those on the side of the other side 6a of the web 6.

[Sixth Preferred Embodiment]

Figure 15:
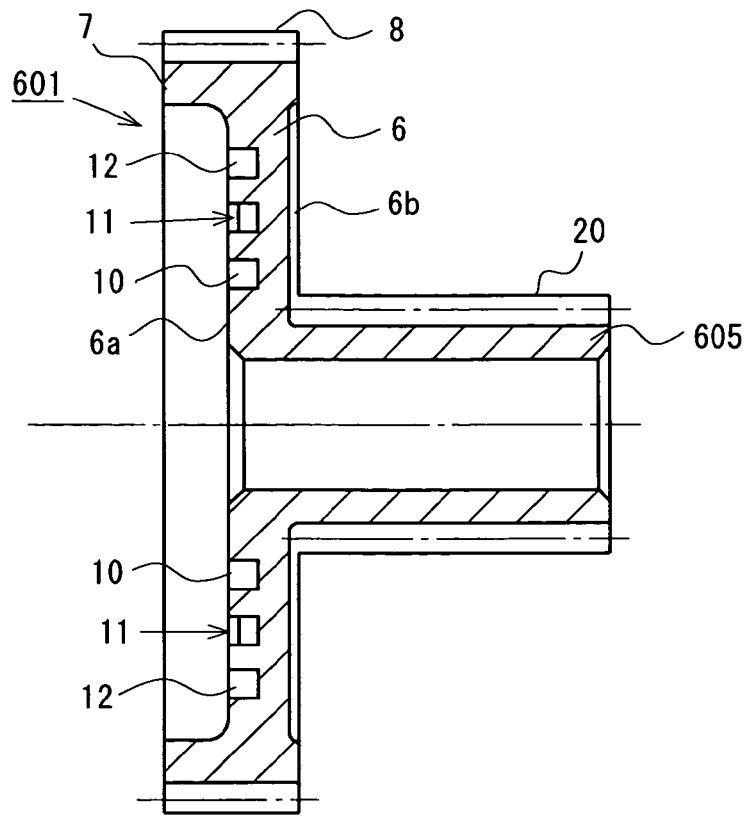
FIG. 15 is a longitudinal section of the sixth preferred embodiment of an injection molded resin gear according to the present invention.

As shown in FIG. 15, an injection molded resin gear 601 in this preferred embodiment substantially has the same construction as that of the injection molded resin gear 1 in the first preferred embodiment, except that a second tooth portion 20 having a small diameter is formed on the outer periphery of a cylindrical shaft supporting portion 605, which protrudes in axial directions from one side 6b of the web 6, in addition to the first teeth 8 having a large diameter formed on the outer periphery of the rim 7. Furthermore, the inside circumferential groove 10, the resin flow velocity regulating groove 11 and the outside circumferential groove 12 may be formed in the other side 6*a* of the web 6.

[Seventh Preferred Embodiment]

Figure 16:
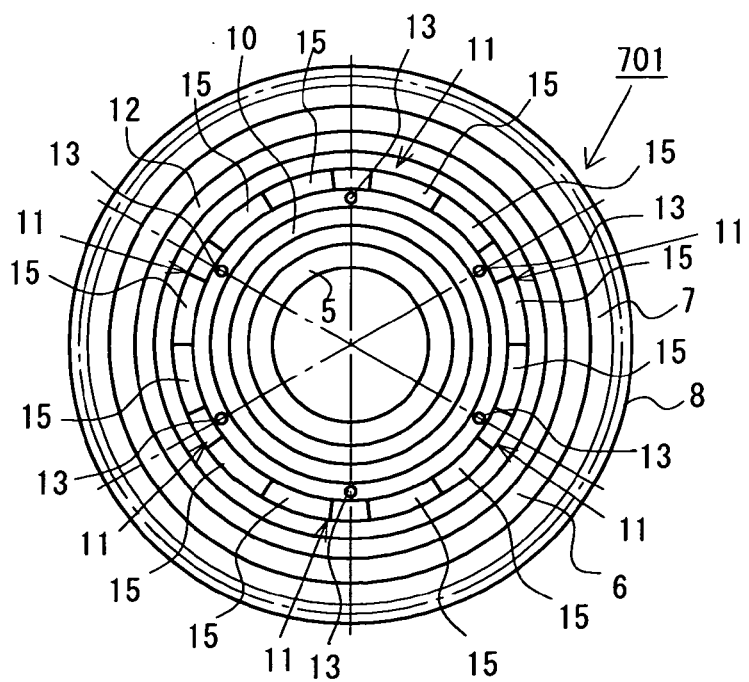
FIG. 16 is a left side view of the seventh preferred embodiment of an injection molded resin gear according to the present invention.
Figure 17:
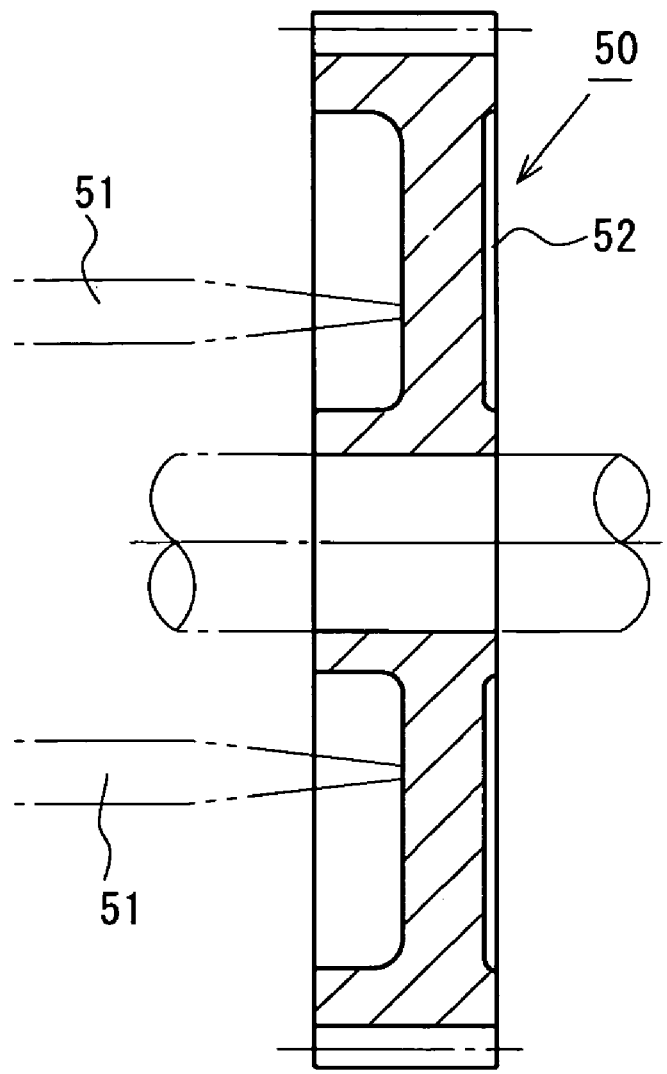
FIG. 17 is a longitudinal section of a first conventional example of an injection molded resin gear (a sectional view taken along line XVII-XVII of FIG. 18)
Figure 18:
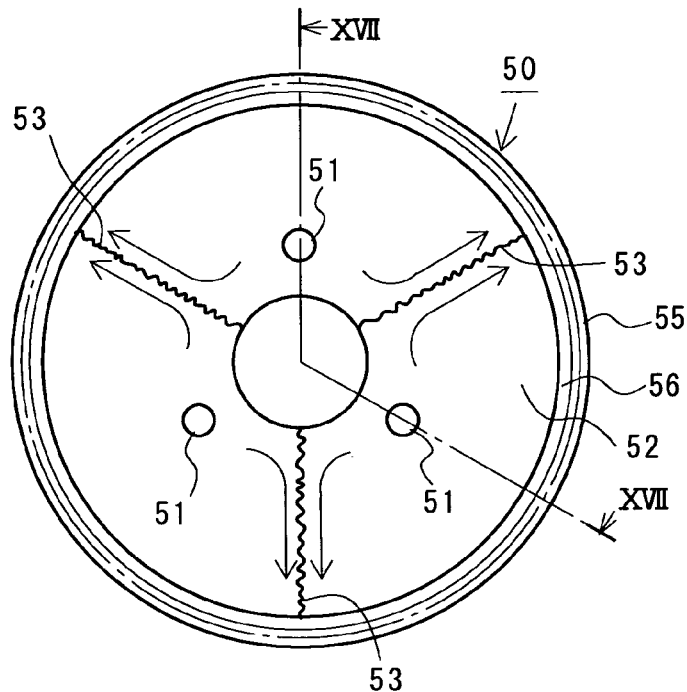
FIG. 18 is a left side view of the first conventional example of the injection molded resin gear.
Figure 19:
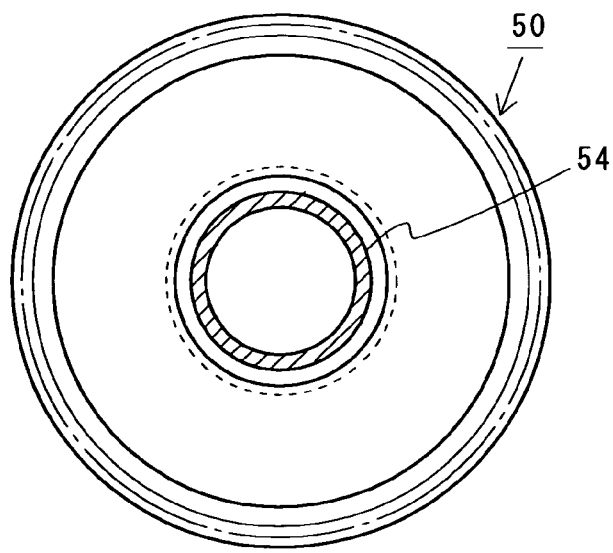
FIG. 19 is a left side view of a second conventional example of an injection molded resin gear.
Figure 20:
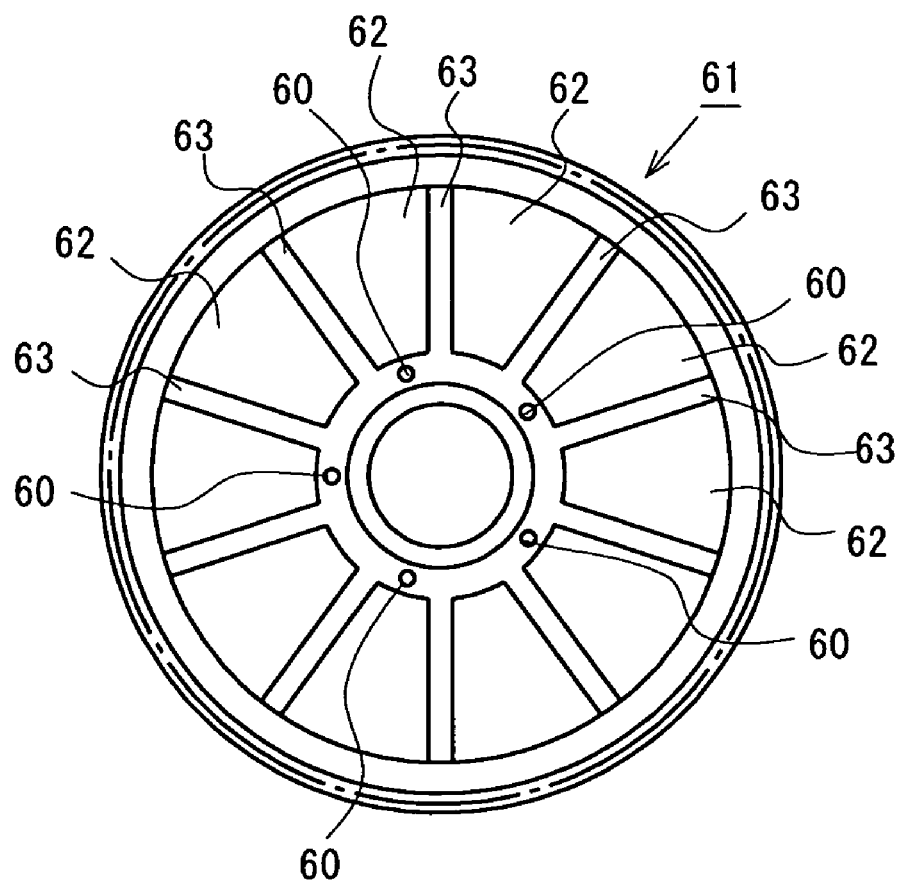
FIG. 20 is a left side view of a third conventional example of an injection molded resin gear.
Figure 21:
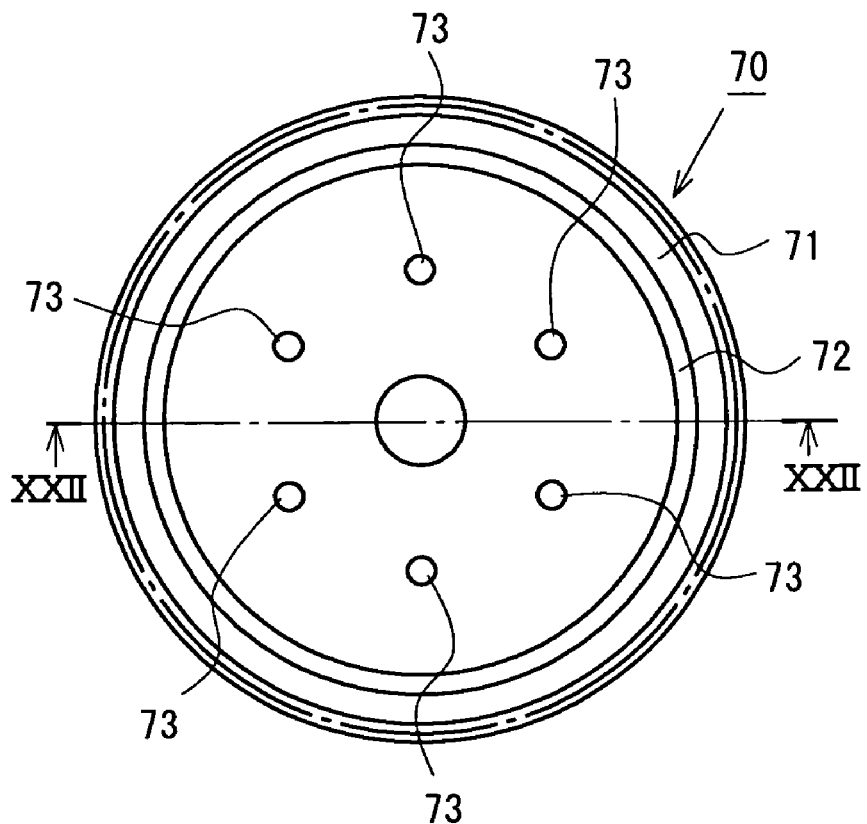
FIG. 21 is a left side view of a fourth conventional example of an injection molded resin gear.
Figure 22:
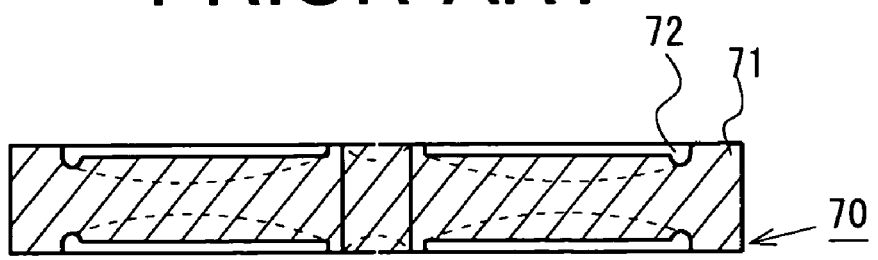
FIG. 22 is a sectional view taken along line XXII-XXII of FIG. 21.

As shown in FIG. 16, an injection molded resin gear 701 in this preferred embodiment substantially has the same construction as that of the injection molded resin gear 1 in the first preferred embodiment, except that rising ends of adjacent two of the second groove portions 15 of the resin flow velocity regulating grooves 11 are coincident with each other. Thus, the area of the resin flow velocity regulating grooves 11 may be extended.

[Eight Preferred Embodiment]

While the six pinpoint gates 13 have been formed at regular intervals in circumferential directions in the first preferred embodiment, the optimum number of pin point gates 13 may be arranged in accordance with the shape and dimension of the gear.

[Ninth Preferred Embodiment]

While the resin flow velocity regulating grooves 11 have been formed outside of the pin point gates 13 in radial directions, the resin flow velocity regulating grooves may be arranged in portions, in which it is required to most sufficiently ensure the precision of shape, and between adjacent two of the pin point gates 13.

[Tenth Preferred Embodiment]

While the present invention have been applied to the injection molded resin gears serving as an injection molded resin rotating body in the above described preferred embodiments, the invention should not be limited thereto. The present invention may be widely applied to an injection molded resin rotating body, such as an injection molded resin sprocket, pulley or roller, which comprises an outer cylindrical portion, a shaft supporting portion into which a shaft is to be fitted, and a disk-shaped portion connecting the cylindrical portion to the shaft supporting portion in radial directions.

As described above, according to the present invention, even if pinpoint gates are used for forming an injection molded resin gear (an injection molded resin rotating body), it is possible to effectively inhibit the occurrence of weld lines. In addition, it is possible to arrange the orientation of a reinforced fiber containing resin material in a portion corresponding to a web over the whole circumference to improve the uniformity of the flow velocity of the resin material in radial directions before the flow of the resin material reaches a portion corresponding to a rim, to enhance the strength of the web, and it is possible to improve the uniformity of the cooling rate to reduce the difference in shrinkage during injection molding, to enhance the molding precision.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An injection molded resin gear molded by injecting a resin material from a pin point gate into a cavity of a die, said injection molded resin gear comprising:

a rim having teeth on the outer periphery thereof;

a shaft supporting portion for receiving and supporting a shaft therein;

a web extending in radial directions to connect said rim to said shaft supporting portion; and a resin flow velocity regulating groove formed in one side of said web so as to be arranged in the vicinity of the pin point gate when the resin material is injected from the pin point gate into the cavity of the die, said resin flow velocity regulating groove having a shape which corresponds to that of a resin flow velocity regulating protrusion of the die for restricting the radial flow of the resin material, which is injected from the pin point gate, to cause the resin material to flow at a uniform velocity in radial directions between the pin point gate and a portion of the cavity corresponding to said rim, wherein said resin flow velocity regulating groove includes a first groove portion which is arranged so as to face the pin point gate in radial directions when the resin material is injected from the pin point gate, and a pair of second groove portions, each of which extends from an end of the first groove portion in a circumferential direction so as to have a gradually decreasing groove depth, and said injection molded resin gear further comprises a first annular groove which is formed in said one side of said web outside of said resin flow velocity regulating groove in radial directions so as to be concentric with said rim.

2. An injection molded resin gear as set forth in claim 1, wherein said resin material is a reinforced fiber containing resin material.

3. An injected molded resin gear as set forth in claim 1, which further comprises a second annular groove which is formed in said one side of said web inside of said resin flow velocity regulating groove in radial directions so as to be concentric with said rim, said pin point gate being arranged between said resin flow velocity regulating groove and said second annular groove when said resin material is injected from said pin point gate.

4. An injection molded resin gear molded by injecting a resin material from a plurality of pin point gates into a cavity of a die, said injection molded resin gear comprising:

a rim having teeth on the outer periphery thereof;

a shaft supporting portion for receiving and supporting a shaft therein;

a web extending in radial directions to connect said rim to said shaft supporting portion; and a plurality of resin flow velocity regulating grooves, each of which is formed in one side of said web so as to be arranged in the vicinity of a corresponding one of the plurality of pin point gates when the resin material is injected from the plurality of pin point gates into the cavity of the die, each of said resin flow velocity regulating grooves having a shape which corresponds to that of a resin flow velocity regulating protrusion of the die for restricting the radial flow of the resin material, which is injected from the corresponding one of the plurality of pin point gates, to cause the resin material to flow at a uniform velocity in radial directions between the corresponding one of the plurality of pin point gates and a portion of the cavity corresponding to said rim, wherein each of said resin flow velocity regulating grooves includes a first groove portion which is arranged so as to face the corresponding one of the plurality of pin point gates in radial directions when the resin material is injected from the plurality of pin point gates, and a pair of second groove portions, each of which extends from an end of the first groove portion in a circumferential direction so as to have a gradually decreasing groove depth, and said injected molded resin gear further comprises a first annular groove which is formed in said one side of said web outside of said plurality of resin flow velocity regulating grooves in radial directions so as to be concentric with said rim.

5. An injection molded resin gear as set forth in claim 4, wherein said resin material is a reinforced fiber containing resin material.

6. An injected molded resin gear as set forth in claim 4, which further comprises a second annular groove which is formed in said one side of said web inside of said plurality of resin flow velocity regulating grooves in radial directions so as to be concentric with said rim, said plurality of pin point gates being arranged between said plurality of resin flow velocity regulating grooves and said second annular groove when said resin material is injected from said plurality of pin point gates.

7. An injection molded resin rotating body molded by injecting a resin material from a pin point gate into a cavity of a die, said injection molded resin rotating body comprising:
   an outside cylindrical portion;
   a shaft supporting portion for receiving and supporting a shaft therein;
   a disk-shaped portion extending in radial directions to connect said outside cylindrical portion to said shaft supporting portion; and
   a resin flow velocity regulating groove formed in one side of said disk-shaped portion so as to be arranged in the vicinity of the pin point gate when the resin material is injected from the pin point gate into the cavity of the die, said resin flow velocity regulating groove having a shape which corresponds to that of a resin flow velocity regulating protrusion of the die for restricting the radial flow of the resin material, which is injected from the pin point gate, to cause the resin material to flow at a uniform velocity in radial directions between the pin point gate and a portion of the cavity corresponding to said outside cylindrical portion,
   wherein said resin flow velocity regulating groove includes a first groove portion which is arranged so as to face the pin point gate in radial directions when the resin material is injected from the pin point gate, and a pair of second groove portions, each of which extends from an end of the first groove portion in a circumferential direction so as to have a gradually decreasing groove depth, and
   said injected molded resin rotating body further comprises a first annular groove which is formed in said one side of said disk-shaped portion outside of said resin flow velocity regulating groove in radial directions so as to be concentric with said outside cylindrical portion.

8. An injection molded resin rotating body as set forth in claim 7, wherein said resin material is a reinforced fiber containing resin material.

9. An injected molded resin rotating body as set forth in claim 7, which further comprises a second annular groove which is formed in said one side of said disk-shaped portion inside of said resin flow velocity regulating groove in radial directions so as to be concentric with said outside cylindrical portion, said pin point gate being arranged between said resin flow velocity regulating groove and said second annular groove when said resin material is injected from said pin point gate.

10. An injection molded resin rotating body molded by injecting a resin material from a plurality of pin point gates into a cavity of a die, said injection molded resin gear comprising:
   an outside cylindrical portion;
   a shaft supporting portion for receiving and supporting a shaft therein;
   a disk-shaped portion extending in radial directions to connect said outside cylindrical portion to said shaft supporting portion; and
   a plurality of resin flow velocity regulating grooves, each of which is formed in one side of said disk-shaped portion so as to be arranged in the vicinity of a corresponding one of the plurality of pin point gates when the resin material is injected from the plurality of pin point gates into the cavity of the die, each of said resin flow velocity regulating grooves having a shape which corresponds to that of a resin flow velocity regulating protrusion of the die for restricting the radial low of the resin material, which is injected from the corresponding one of the plurality of pin point gates, to cause the resin material to flow at a uniform velocity in radial directions between the corresponding one of the plurality of pin point gates and a portion of the cavity corresponding to said outside cylindrical portion,
   wherein each of said resin flow velocity regulating grooves includes a first groove portion which is arranged so as to face a corresponding one of the plurality of pin point gates in radial directions when the resin material is injected from the plurality of pin point gates, and a pair of second groove portions, each of which extends from an end of the first groove portion in a circumferential direction so as to have a gradually decreasing groove depth, and
   said injected molded resin rotating body further comprises a first annular groove which is formed in said one side of said web outside of said plurality of resin flow velocity regulating grooves in radial directions so as to be concentric with said outside cylindrical portion.

11. An injection molded resin rotating body as set forth in claim 10, wherein said resin material is a reinforced fiber containing resin material.

12. An injected molded resin rotating body as set forth in claim 10, which further comprises a second annular groove which is formed in said one side of said disk-shaped portion inside of said plurality of resin flow velocity regulating grooves in radial directions so as to be concentric with said outside cylindrical portion, said plurality of pin point gates being arranged between said plurality of resin flow velocity regulating grooves and said second annular groove when said resin material is injected from said plurality of pin point gates.

* * * * *

UNITED STATES PATENT AND TRADEMARK OFFICE
CERTIFICATE OF CORRECTION

| | |
|---|---|
| PATENT NO. | : 7,406,891 B2 |
| APPLICATION NO. | : 10/858902 |
| DATED | : August 5, 2008 |
| INVENTOR(S) | : Shoji Miyasaka |

It is certified that error appears in the above-identified patent and that said Letters Patent is hereby corrected as shown below:

In column 16, claim 10, line 24, after "radial" delete "low" and insert --flow--.

Signed and Sealed this

Ninth Day of December, 2008

JON W. DUDAS
*Director of the United States Patent and Trademark Office*